(12) United States Patent
Kameo et al.

(10) Patent No.: US 11,128,480 B2
(45) Date of Patent: Sep. 21, 2021

(54) INFORMATION DISTRIBUTION DEVICE, DISTRIBUTION TARGET DEVICE, INFORMATION DISTRIBUTION SYSTEM, INFORMATION DISTRIBUTION METHOD, AND NON-TRANSITORY COMPUTER-READABLE MEDIUM

(71) Applicant: MITSUBISHI HEAVY INDUSTRIES, LTD., Tokyo (JP)

(72) Inventors: Naruhisa Kameo, Tokyo (JP); Fumikado Anzai, Tokyo (JP); Etsuji Nishimae, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 331 days.

(21) Appl. No.: 16/268,996

(22) Filed: Feb. 6, 2019

(65) Prior Publication Data
US 2019/0280884 A1 Sep. 12, 2019

(30) Foreign Application Priority Data
Mar. 9, 2018 (JP) .............................. JP2018-043596

(51) Int. Cl.
*H04L 9/08* (2006.01)
*H04L 9/00* (2006.01)
(Continued)

(52) U.S. Cl.
CPC .............. *H04L 9/3278* (2013.01); *G06F 8/65* (2013.01); *G06F 21/57* (2013.01); *H04L 9/0866* (2013.01); *H04L 2209/24* (2013.01)

(58) Field of Classification Search
CPC . H04L 9/3278; H04L 9/0866; H04L 2209/24; G06F 21/73; G06F 21/57; G06F 8/65
See application file for complete search history.

(56) References Cited

U.S. PATENT DOCUMENTS 8,848,905 B1 * 9/2014 Hamlet ................. H04L 9/0866
 380/35
10,432,409 B2 * 10/2019 Wallrabenstein ..... H04L 9/3066
(Continued)

FOREIGN PATENT DOCUMENTS

JP  1-212041   8/1989
JP  1-225251   9/1989
(Continued)

OTHER PUBLICATIONS

M. A. Gora, A. Maiti and P. Schaumont, "A Flexible Design Flow for Software IP Binding in FPGA," in IEEE Transactions on Industrial Informatics, vol. 6, No. 4, pp. 719-728, Nov. 2010, doi: 10.1109/TII.2010.2068303. (Year: 2010).*

(Continued)

*Primary Examiner* — Michael Simitoski
(74) *Attorney, Agent, or Firm* — Wenderoth, Lind & Ponack, L.L.P.

(57) ABSTRACT

An information distribution device configured to distribute an encrypted update program to a control device connected through a wide-area communication network includes: a physically unclonable function (PUF) information acquiring unit configured to acquire PUF information of the control device recorded in advance; an additional information acquiring unit configured to specify and acquire any of a plurality of pieces of additional information recorded in advance; an encryption processing unit configured to encrypt protection target information based on the PUF information and the additional information that are acquired; and a transmission processing unit configured to transmit the encrypted update program to the control device, wherein the additional information acquiring unit is configured to change the additional information to be specified in accordance with a time.

9 Claims, 11 Drawing Sheets

| U1 (U) | | U2 (U) | | U3 (U) | |
|---|---|---|---|---|---|
| <OTHER-DEVICE PUF INFORMATION TABLE (FOR A01)> | | <OTHER-DEVICE PUF INFORMATION TABLE (FOR A02)> | | <OTHER-DEVICE PUF INFORMATION TABLE (FOR A03)> | |
| CONTROL DEVICE IDENTIFICATION NUMBER | PUF INFORMATION | CONTROL DEVICE IDENTIFICATION NUMBER | PUF INFORMATION | CONTROL DEVICE IDENTIFICATION NUMBER | PUF INFORMATION |
| A02 | P02 (11011001···) | A01 | P01 (01001101···) | A01 | P01 (01001101···) |
| A03 | P03 (00101110···) | A03 | P03 (00101110···) | A02 | P02 (11011001···) |
| ··· | ··· | ··· | ··· | ··· | ··· |

(51) Int. Cl.
*H04L 9/32* (2006.01)
*G06F 21/57* (2013.01)
*G06F 8/65* (2018.01)
*G06F 12/14* (2006.01)

(56) References Cited

U.S. PATENT DOCUMENTS

| | | |
|---|---|---|
| 2003/0103628 A1 | 6/2003 | Luc et al. |
| 2006/0210082 A1* | 9/2006 | Devadas ............... G06F 21/31 380/277 |
| 2007/0239615 A1* | 10/2007 | Matsuzaki ....... G06K 19/07749 705/55 |
| 2008/0260152 A1* | 10/2008 | Skoric .................. H04L 9/3278 380/258 |
| 2012/0045061 A1 | 2/2012 | Danger et al. |
| 2012/0183135 A1* | 7/2012 | Paral .................... H04L 9/0866 380/44 |
| 2012/0204023 A1* | 8/2012 | Kuipers ............... H04L 9/0866 713/150 |
| 2013/0044874 A1* | 2/2013 | Murray ............... H04N 21/4181 380/44 |
| 2013/0051552 A1* | 2/2013 | Handschuh .......... H04L 9/0866 380/44 |
| 2014/0173270 A1* | 6/2014 | Matsuo ................ H04L 9/0869 713/150 |
| 2014/0376717 A1* | 12/2014 | Macchetti ................ H04L 9/14 380/28 |
| 2015/0180654 A1* | 6/2015 | Falk ........................ H04L 9/14 380/44 |
| 2015/0234751 A1* | 8/2015 | Van Der Sluis ...... H04L 9/0866 713/193 |
| 2015/0317480 A1* | 11/2015 | Gardner ................. H04L 9/32 726/2 |
| 2016/0227348 A1* | 8/2016 | Guo ..................... G06F 21/6218 |
| 2018/0006813 A1* | 1/2018 | Van Der Leest ..... H04L 9/0869 |
| 2018/0145838 A1* | 5/2018 | Wang .................... H04L 9/0866 |
| 2018/0270014 A1* | 9/2018 | Muratani ............. H04L 1/0041 |
| 2019/0028282 A1* | 1/2019 | Sharifi .................. G11C 29/52 |
| 2019/0199525 A1* | 6/2019 | Mondello ............. H04L 9/0866 |
| 2019/0385489 A1* | 12/2019 | Norrman .................. G09C 1/00 |

FOREIGN PATENT DOCUMENTS

| | | |
|---|---|---|
| JP | 2003-198528 | 7/2003 |
| JP | 2010-182070 | 8/2010 |
| JP | 2012-516094 | 7/2012 |
| JP | 2014-096692 | 5/2014 |
| JP | 2015-36257 | 2/2015 |
| JP | 2015-532549 | 11/2015 |

OTHER PUBLICATIONS

M. A. Prada-Delgado, A. Vázquez-Reyes and I. Baturone, "Trustworthy firmware update for Internet-of-Thing Devices using physical unclonable functions," 2017 Global Internet of Things Summit (GIoTS), Geneva, 2017, pp. 1-5, doi: 10.1109/GIOTS.2017.8016282. (Year: 2017).*
Sanjo et al., "Proposal and Implementation Evaluation of Secure Boot for Automotive ECU as Trust Anchor Using Unique ID Generated from PUF", General Incorporated Electronic Information Communication Enhineers, Jan. 23, 2018, 2D1 to 3, p. 1-8.
Sanjo et al., "Implementaion and Evaluation of Secure Remote Reprogramming System based on Symmetric Key Cryptography using PUF for Key Storage", Institute of Electronics, Information and Communication Engineers, Jan. 24, 2017, 2E3-6, p. 1-7.
Shibata et al., "Mechanism-based PKI", Information Processing Society of Japan, Oct. 29, 2003, No. 15, p. 181-186.
Notice of Reasons for Refusal dated Feb. 18, 2020 in corresponding Japanese Patent Application No. 2018-043596, with English-language translation.

* cited by examiner

<PUF INFORMATION TABLE> T1

| CONTROL DEVICE IDENTIFICATION NUMBER | PUF INFORMATION |
|---|---|
| A01 | P01 (01001101···) |
| A02 | P02 (11011001···) |
| A03 | P03 (00101110···) |
| ... | ... |

FIG. 9

<PUF INFORMATION TABLE> T1

| CONTROL DEVICE IDENTIFICATION NUMBER | PAST PUF INFORMATION | | | PUF INFORMATION |
|---|---|---|---|---|
| A01 | UPDATE TIME t10 (BEFORE SHIPMENT) | UPDATE TIME t11 | UPDATE TIME t12 | UPDATE TIME t13 |
|  | P01_t10 (01001101⋯) | P01_t11 (01001101⋯) | P01_t12 (01001101⋯) | P01 (01001101⋯) |
| A02 | UPDATE TIME t20 (BEFORE SHIPMENT) | UPDATE TIME t21 | UPDATE TIME t22 | UPDATE TIME t23 |
|  | P02_t20 (11011001⋯) | P02_t21 (11011101⋯) | P02_t22 (10011101⋯) | P02 (00011101⋯) |
| A03 | UPDATE TIME t30 (BEFORE SHIPMENT) | UPDATE TIME t31 | UPDATE TIME t32 | UPDATE TIME t33 |
|  | P03_t30 (00100110⋯) | P03_t31 (10100110⋯) | P03_t32 (10100100⋯) | P03 (10101100⋯) |
| ⋯ | ⋯ | ⋯ | ⋯ | ⋯ |

FIG. 10

<TIME TABLE> T2

| | | DISTRIBUTION TARGET: A01 | DISTRIBUTION TARGET: A02 | DISTRIBUTION TARGET: A03 | ⋯ |
|---|---|---|---|---|---|
| PERIOD | Y1 | t10 | t20 | t30 | ⋯ |
|  | Y2 | t11 | t21 | t31 | ⋯ |
|  | Y3 | t12 | t22 | t32 | ⋯ |
|  | ⋯ | ⋯ | ⋯ | ⋯ | ⋯ |

←--UPDATE TIME

INFORMATION DISTRIBUTION DEVICE, DISTRIBUTION TARGET DEVICE, INFORMATION DISTRIBUTION SYSTEM, INFORMATION DISTRIBUTION METHOD, AND NON-TRANSITORY COMPUTER-READABLE MEDIUM

CROSS-REFERENCE TO RELATED APPLICATION

Priority is claimed from Japanese Patent Application No. 2018-043596, filed Mar. 9, 2018, the content of which is incorporated herein by reference.

TECHNICAL FIELD

The present disclosure relates to an information distribution device, a distribution target device, an information distribution system, an information distribution method, and a non-transitory computer-readable medium.

BACKGROUND ART

As techniques for protecting software of an embedded system, protection using encryption that uses a trusted platform module (TPM) and a technique for detecting a change in environment and removing software have been proposed. In addition, it has been proposed that a physical quantity such as a manufacturing variation or a difference in physical characteristics of a semiconductor chip called a physically unclonable function (PUF) be output as a unique value of the semiconductor chip and be used for determination of the genuineness thereof (for example, see Japanese Unexamined Patent Application, First Publication No. 2010-182070).

For example, in an embedded system of a gas turbine or the like, a control program of a control device is updated regularly or irregularly. In such a case, an information distribution device distributes an update program to each control device installed at respective places through a wide-area communication network (for example, an Internet line or the like).

In order to prevent wiretapping by a third party and leakage, generally, an update program and the like are distributed in an encrypted state.

SUMMARY

In a case in which encrypted data encrypted using the same encryption key information is repeatedly distributed a plurality of number of times, there is a likelihood that encrypted data encrypted using the same encryption key information will be obtained and collected by a third party through wire-tapping. In such a case, many pieces of collected encrypted data may be analyzed, and there is a high risk of the encryption key information being decoded. Even in a case in which the PUF described above is used for the encryption key information, this risk still remains.

An object of the present disclosure is to provide an information distribution device, a distribution target device, an information distribution system, an information distribution method, and a non-transitory computer-readable medium capable of reducing the risk of encryption key information being decoded.

According to an aspect of the present disclosure, there is provided an information distribution device configured to distribute encrypted protection target information to a distribution target device connected through a communication network, the information distribution device including: a PUF information acquiring unit configured to acquire PUF information of the distribution target device recorded in advance; an additional information acquiring unit configured to specify and acquire any of a plurality of pieces of additional information recorded in advance; an encryption processing unit configured to encrypt protection target information on the basis of the PUF information and the additional information that are acquired; and a transmission processing unit configured to transmit the encrypted protection target information to the distribution target device, wherein the additional information acquiring unit is configured to change the additional information to be specified in accordance with a time.

According to the above-described aspect of the present disclosure, a risk of information, which is a protection target, being leaked can be reduced.

BRIEF DESCRIPTION OF DRAWINGS

FIG. 9 is a diagram illustrating a PUF information table according to the second embodiment;

FIG. 10 is a diagram illustrating a time table according to the second embodiment;

DESCRIPTION OF EMBODIMENTS

First Embodiment

An information distribution system according to a first embodiment will be described with reference to FIGS. 1 to 7.

(Overview of Manufacturing Process of Control Device)

Figure 1:
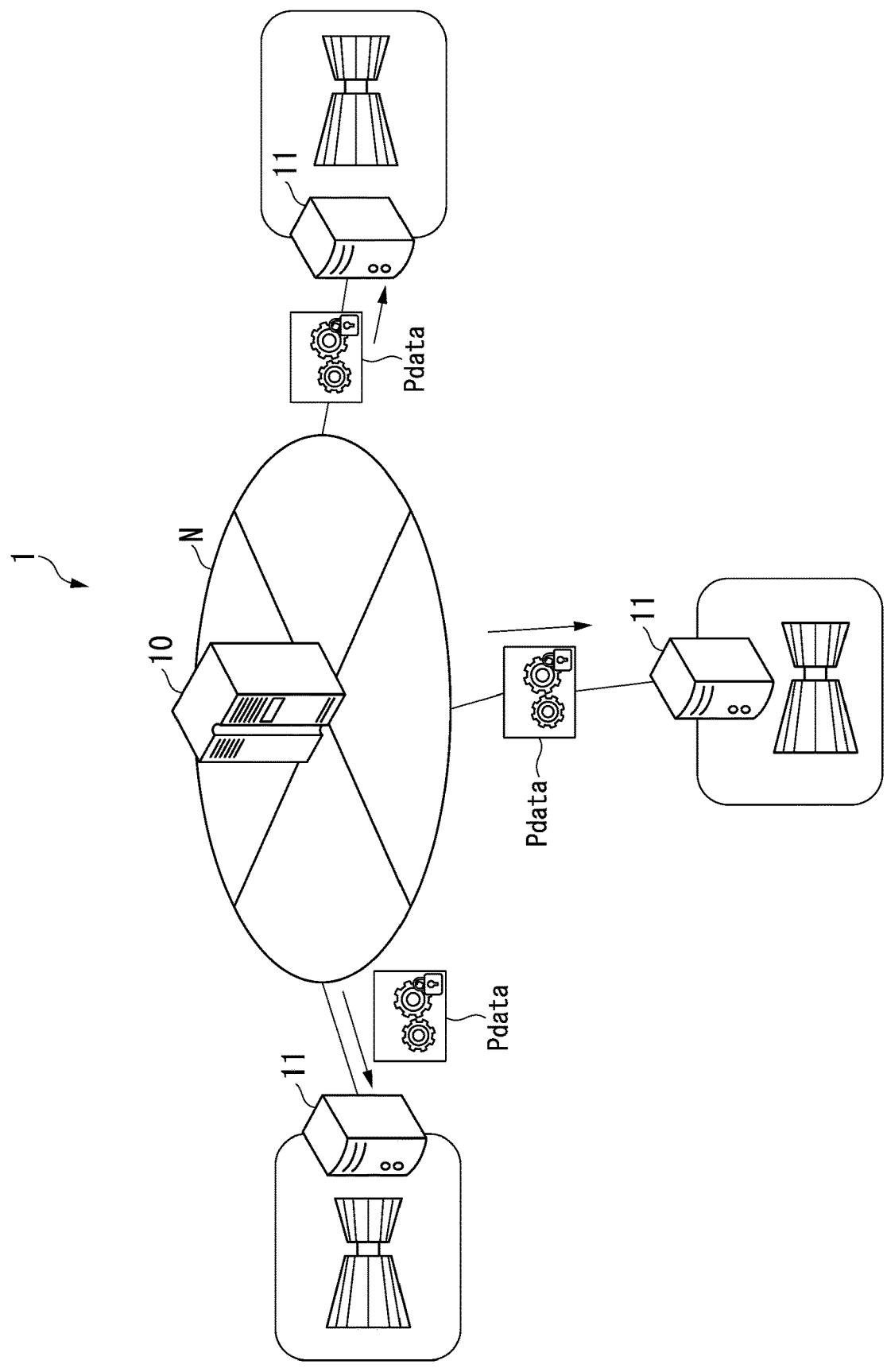
FIG. 1 is a diagram illustrating the entire configuration of an information distribution system according to a first embodiment.

FIG. 1 is a diagram illustrating the entire configuration of an information distribution system according to a first embodiment.

The information distribution system 1 illustrated in FIG. 1 manages a control device 11 installed at respective places. The control device 11 according to this embodiment is a control device that controls a gas turbine, a boiler, and the like of a power generation plant. However, such an aspect is not limited in other embodiments, and the control device 11 may have any device or apparatus as its control target.

As illustrated in FIG. 1, the information distribution system 1 includes an information distribution device 10 and a plurality of control devices 11. The information distribution device 10 and the plurality of control devices 11 are communicatively connected through a wide-area communication network N such as an Internet line or the like.

The information distribution device 10 distributes an encrypted update program Pdata (protection target information) to the plurality of control devices 11 (distribution target devices) connected through the wide-area communication network N. The update program Pdata is a program that updates a control program used for operating the control device 11. The update program is regularly or irregularly distributed from a viewpoint of enhancement of a function, improvement of security, and the like of the control device 11.

In order to prevent leakage of know-how through third party's wire-tapping, the information distribution device 10 encrypts and transmits an update program Pdata, which is protection target information.

The control device 11 is a control device that controls a gas turbine and the like by operating in accordance with a control program. The control device 11 receives an encrypted update program from the information distribution device 10 connected through the wide-area communication network N and updates the control program.

(Functional Configuration of Information Distribution Device)

Figures 2, 3:
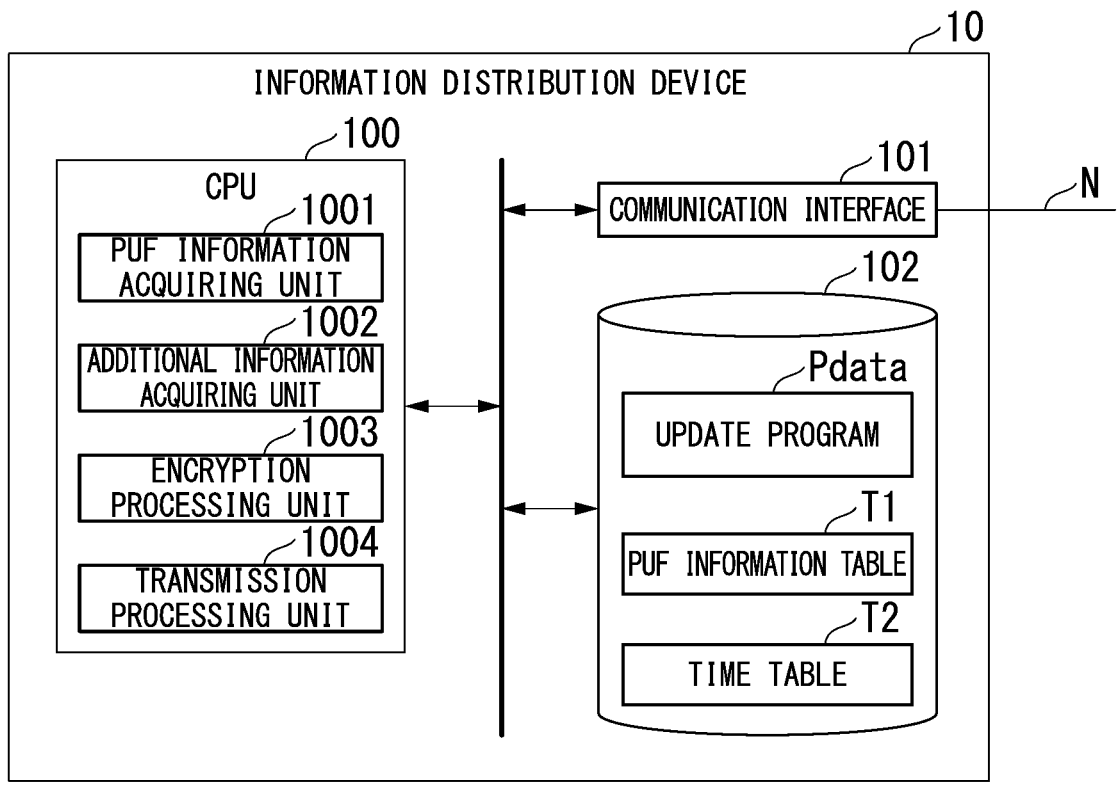
FIG. 2 is a diagram illustrating the functional configuration of an information distribution device according to the first embodiment.
FIG. 3 is a diagram illustrating a PUF information table according to the first embodiment.

FIG. 2 is a diagram illustrating the functional configuration of an information distribution device according to the first embodiment.

As illustrated in FIG. 2, the information distribution device 10 includes a CPU 100, a communication interface 101, and a recording medium 102.

The CPU 100 is a processor that operates in accordance with a predetermined program prepared in advance. Various functions exhibited in a case in which the CPU 100 operates in accordance with the program will be described later.

The communication interface 101 is a communication module that is used for performing communication through the wide-area communication network N (FIG. 1). In addition, a form of communication between the information distribution device 10 and the control device 11 through the communication interface 101 and the wide-area communication network N may be a form based on wired connection or a form based on wireless communication.

The recording medium 102 is a so-called auxiliary storage device such as a hard disk drive (HDD) or a solid state drive (SSD) and is one type of nonvolatile memory. In the recording medium 102 according to this embodiment, the update program Pdata to be distributed, and a PUF information table T1 and a time table T2 to be described later are recorded.

Next, various functions of the CPU 100 will be described in detail.

The CPU 100 functions as a PUF information acquiring unit 1001, an additional information acquiring unit 1002, an encryption processing unit 1003, and a transmission processing unit 1004.

The PUF information acquiring unit 1001 acquires physically unclonable function (PUF) information of one control device 11 that is a distribution target by referring to the PUF information table T1. The PUF information is information that is uniquely generated in accordance with variations in physical and electrical characteristics generated in a manufacturing process of hardware (an integrated circuit and the like) included in the control device 11 and is information that is different for each control device 11.

The additional information acquiring unit 1002 specifies and acquires one of a plurality of pieces of additional information recorded in advance. Here, the additional information is PUF information of another control device 11 other than one control device 11 that is a distribution target of the information distribution device 10. The additional information acquiring unit 1002 specifies one of a plurality of pieces of additional information by referring to the time table T2 to be described later.

The encryption processing unit 1003 acquires encryption key information on the basis of the PUF information acquired by the PUF information acquiring unit 1001 and the additional information acquired by the additional information acquiring unit 1002 and encrypts the update program Pdata on the basis of the acquired encryption key information.

The transmission processing unit 1004 transmits the encrypted update program Pdata to the control device 11.

(PUF Information Table)

FIG. 3 is a diagram illustrating a PUF information table according to the first embodiment.

As illustrated in FIG. 3, in the PUF information table T1 recorded on the recording medium 102, a "control device identification number" and "PUF information" are recorded in association with each other.

In a column of the "control device identification number," individual identification numbers (A01, A02, A03, . . . ) of the plurality of control devices 11 installed at respective places are recorded. An individual identification number, for example, may be a manufacturing number or the like.

In a column of the "PUF information," PUF information (P01, P02, P03, . . . ) read from each control device 11 is recorded in a stage before the shipment of the control device 11.

(Time Table)

Figures 4, 5:
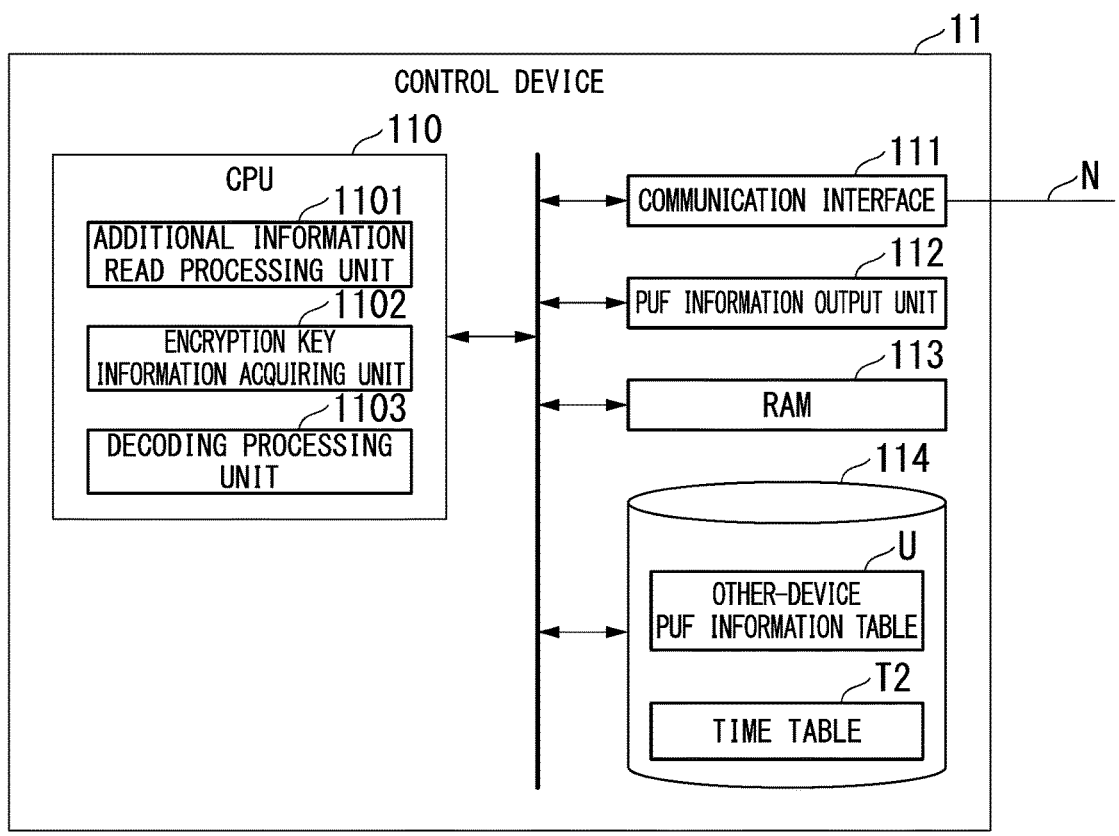
FIG. 4 is a diagram illustrating a time table according to the first embodiment.
FIG. 5 is a diagram illustrating the functional configuration of a control device according to the first embodiment.

FIG. 4 is a diagram illustrating a time table according to the first embodiment.

As illustrated in FIG. 4, periods (Y1, Y2, . . . ) and control device identification numbers (A01, A02, . . . ) are recorded in the time table T2 in association with each other.

As the periods (Y1, Y2, . . . ), periods specified using an actual year, month, and date, hour and minute, and the like are recorded. The periods (Y1, Y2, . . . ) may be divided into any of the units such as the hour, date, week, month, year, and the like.

The control device identification numbers (A01, A02, . . . ) are information similar to the PUF information table T1 illustrated in FIG. 3 and are individual identification numbers (A01, A02, A03, . . . ) of the control devices 11.

As illustrated in FIG. 4, a control device identification number (A01, A02, . . . ) is associated with each control device 11 that is a distribution target of the update program Pdata in the time table T2.

In a column of "distribution target: A01," control device identification numbers other than "A01" are recorded. In a column of "distribution target: A02," control device identification numbers other than "A02" are recorded.

Similarly, in a column of "distribution target: A03," control device identification numbers other than "A03" are recorded. This similarly applies also to the other columns.
(Functional Configuration of Control Device)

FIG. 5 is a diagram illustrating the functional configuration of a control device according to the first embodiment.

As illustrated in FIG. 5, the control device 11 includes a CPU 110, a communication interface 111, a PUF information output unit 112, a RAM 113, and a recording medium 114.

The CPU 110 is a processor that operates in accordance with a predetermined program prepared in advance. Various functions exhibited in a case in which the CPU 110 operates in accordance with the program will be described later.

The communication interface 111 is a communication module that is used for communication through the wide-area communication network N (FIG. 1).

The PUF information output unit 112 is an integrated circuit that outputs unique PUF information to the control device 11. In this embodiment, a known PUF technology (for example, an SRAM_PUF, a Glitch PUF, or the like) may be applied to the PUF information output unit 112. In addition, although the PUF information according to this embodiment, for example, is a data row having a data length of 128 bits, this aspect is not limited in other embodiments and may be a data row longer or shorter than 128 bits.

The RAM 113 is a volatile memory in which information can be rewritten. The RAM 17 is a so-called main memory device, and a program for operating the CPU 110 is loaded therein. Particularly, in this embodiment, a control program for operating as a control device of a gas turbine or the like, an update program Pdata thereof, and the like are loaded in the RAM 113.

The recording medium 114 is a flash ROM or the like and is a nonvolatile memory that can rewrite information. An other-device PUF information table U and the time table T2 (FIG. 4) are recorded in advance in the recording medium 114 in a stage before shipment.

Next, various functions of the CPU 110 will be described in detail.

The CPU 110 functions as an additional information read processing unit 1101, an encryption key information acquiring unit 1102, and a decoding processing unit 1103.

The additional information read processing unit 1101 specifies and reads one piece of additional information from the recording medium 114 in which a plurality of pieces of additional information (PUF information of the other control devices 11) are recorded in advance. The additional information read processing unit 1101 according to this embodiment similarly specifies one piece of additional information on the basis of the time table T2 recorded in the recording medium 114.

The encryption key information acquiring unit 1102 acquires encryption key information based on the specified additional information (PUF information of the other control device 11) and PUF information output by the PUF information output unit 112. The decoding processing unit 1103 decodes the update program Pdata distributed from the information distribution device 10 using the encryption key information acquired by the encryption key information acquiring unit 1102.

(Other-Device PUF Information Table)

Figure 6:
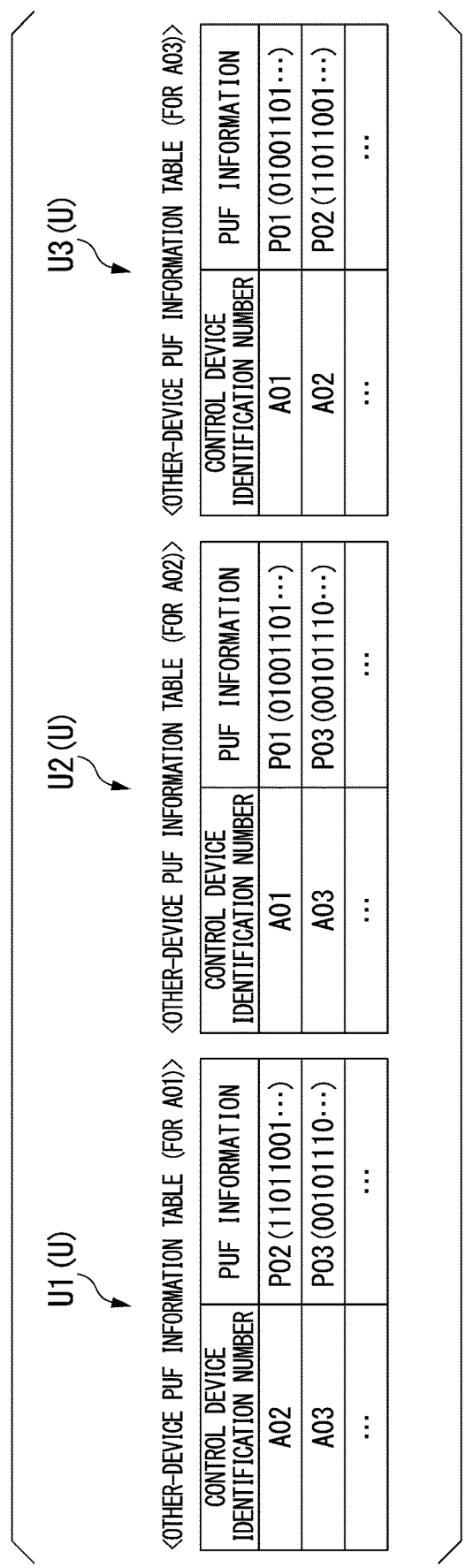
FIG. 6 is a diagram illustrating another device PUF information table according to the first embodiment.

FIG. 6 is a diagram illustrating other-device PUF information tables according to the first embodiment.

As illustrated in FIG. 6, in each of the other-device PUF information tables U (U1 to U3), a control device identification number of a control device 11 and the PUF information thereof are recorded in association with each other.

In the other-device PUF information table U, different information is recorded in each of a plurality of control devices 11. More specifically, in the other-device PUF information table U1 of a control device 11 of which the control device identification number is "A01," PUF information of control devices 11 having control device identification numbers other than "A01" is recorded. In addition, in the other-device PUF information table U2 of a control device 11 of which the control device identification number is "A02," PUF information of control devices 11 having control device identification numbers other than "A02" is recorded. Furthermore, in the other-device PUF information table U3 of a control device 11 of which the control device identification number is "A03," PUF information of control devices 11 having control device identification numbers other than "A03" is recorded.

This similarly applies also to control devices 11 of which the control device identification numbers are other than "A01," "A02," and "A03."
(Process Flow)

Figure 7:
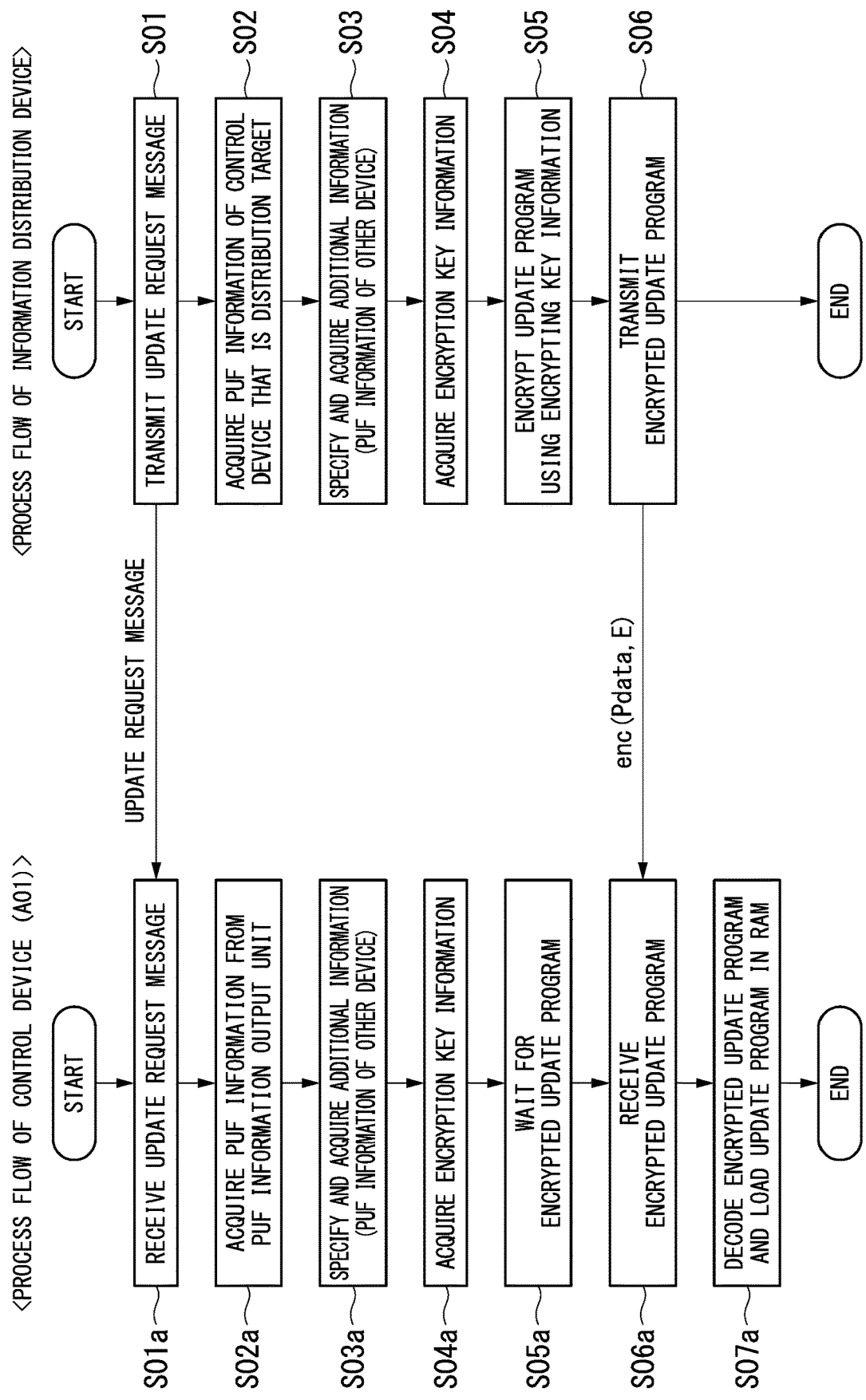
FIG. 7 is a diagram illustrating a process flow executed by an information distribution device and a control device according to the first embodiment.

FIG. 7 is a diagram illustrating a process flow executed by an information distribution device and a control device according to the first embodiment.

The process flow illustrated in FIG. 7 is a process flow executed when the information distribution device 10 distributes an update program to the control device 11.
[Process Flow of Information Distribution Device]

First, the process flow (Steps S01 to S06) of the information distribution device 10 will be described.

The information distribution device 10 distributes an update request message to a control device 11 that is a distribution target (Step S01).

Next, the PUF information acquiring unit 1001 of the information distribution device 10 acquires PUF information of the control device 11 that is a distribution target by referring to the PUF information table T1 (FIG. 3) recorded in the recording medium 102 in advance (Step S02). For example, in a case in which a control device 11 of which the control device identification number is "A01" is set as a distribution target, the PUF information acquiring unit 1001 acquires PUF information P1 that is "01001101 . . . " by referring to the PUF information table T1 (see FIG. 3).

Next, the additional information acquiring unit 1002 of the information distribution device 10 specifies and acquires one among pieces of PUF information of control devices 11 other than the control device 11 that is the distribution target as additional information (Step S03).

More specifically, first, the additional information acquiring unit 1002 specifies one of control device identification numbers (A01, A02, . . . ) corresponding to the current time and the distribution target by referring to the time table T2 (FIG. 4) recorded in the recording medium 102 in advance. For example, in a case in which the current time belongs to a period Y1, and the control device 11 of which the control device identification number is "A01" is set as a distribution target, the additional information acquiring unit 1002 specifies a control device identification number "A02" by referring to the time table T2 (see FIG. 4).

Subsequently, the additional information acquiring unit 1002 acquires PUF information corresponding to the control device identification number, which has been specified by referring to the time table T2, by referring to the PUF information table T1 (FIG. 3). For example, in a case in which a control device identification number "A02" is specified by referring to the time table T2, the additional information acquiring unit 1002 additionally acquires PUF information P02 that is "11011001 . . . " by referring to the PUF information table T1 (see FIG. 3).

Next, the encryption processing unit 1003 of the information distribution device 10 acquires encryption key information E based on the PUF information acquired in Step S02 (hereinafter, denoted as PUF information P01 in accordance with the example described above) and the PUF information acquired in Step S03 (hereinafter, denoted as PUF information P02 in accordance with the example described above) (Step S04). Here, the encryption key information E may be a data row acquired by simply combining the PUF information P01 and the PUF information P02 or may be a data row calculated through logical calculation defined in advance.

Next, the encryption processing unit 1003 encrypts an update program Pdata using the acquired encryption key information E (Step S05).

Hereinafter, the update program Pdata encrypted using the encryption key information E will be also denoted as an "encrypted update program enc (Pdata, E)."

Next, the transmission processing unit 1004 of the information distribution device 10 distributes the encrypted update program enc (Pdata, E) to the control device 11 that is a distribution target (Step S06).

[Process Flow of Control Device]

Next, the process flow (Steps S01a to S07a) of the control device 11 will be described.

The control device 11 receives an update request message from the information distribution device 10 (Step S01a).

When the update request message is received, the CPU 110 of the control device 11 acquires PUF information output from the PUF information output unit 112 (Step S02a).

Next, the additional information read processing unit 1101 of the control device 11 specifies and acquires one among pieces of PUF information of control devices 11 other than the control device 11 that is the distribution target by referring to the recording medium 114 (Step S03a).

More specifically, first, the additional information read processing unit 1101 specifies one of control device identification numbers (A01, A02, . . . ) corresponding to the current time and a control device 11 (its own device) that is the distribution target by referring to the time table T2 (FIG. 4) recorded in the recording medium 114 in advance. For example, in a case in which the current time belongs to a period Y1, and the control device identification number of its own device is "A01," the additional information read processing unit 1101 specifies a control device identification number "A02" by referring to the time table T2 (see FIG. 4).

Subsequently, the additional information read processing unit 1101 acquires PUF information corresponding to the control device identification number, which has been specified by referring to the time table T2, by referring to the other-device PUF information table U (FIG. 6) recorded in the recording medium 114 in advance. For example, in a case in which the control device identification number of its own device is "A01," and the control device identification number "A02" is specified by referring to the time table T2, the additional information read processing unit 1101 acquires PUF information P02 that is "11011001 . . . " by referring to the other-device PUF information table U1 (see FIG. 6).

Next, the encryption key information acquiring unit 1102 of the control device 11 acquires encryption key information E based on the PUF information acquired in Step S02a (hereinafter, denoted as PUF information P01 in accordance with the example described above) and the PUF information acquired in Step S03a (hereinafter, denoted as PUF information P02 similar to the example described above) (Step S04a). The encryption key information E acquired here is the same as the encryption key information E acquired in Step S04 by the information distribution device 10.

After acquiring the encryption key information E, the CPU 110 of the control device 11 waits for an encrypted update program enc (Pdata, E) from the information distribution device 10 (Step S05a).

Subsequently, the CPU 110 receives the encrypted update program enc (Pdata, E) distributed from the information distribution device 10 (Step S06a).

Then, the CPU 110 decodes the encrypted update program enc (Pdata, E) using the encryption key information E and loads the decoded update program in the RAM 113 (Step S07a). Accordingly, the CPU 110 can execute the update program Pdata.

(Operation and Effects) As described above, the information distribution device 10 according to the first embodiment is configured to include the PUF information acquiring unit 1001, the additional information acquiring unit 1002, the encryption processing unit 1003, and the transmission processing unit 1004 described above. Further, the additional information acquiring unit 1002 changes additional information to be specified in accordance with a time. More specifically, according to the process described in the time table T2 illustrated in FIG. 4 and the process of Step S03 illustrated in FIG. 7, when the update program Pdata is distributed, different additional information (PUF information of other devices) is specified.

According to such an aspect, encryption is performed using different encryption key information for each timing of update, and accordingly, a risk of the encryption key information being decoded is reduced.

Therefore, a risk of information (an update program), which is a protection target, being leaked can be reduced.

Second Embodiment

Next, an information distribution system according to a second embodiment will be described with FIGS. 8 to 14.

(Functional Configuration of Information Distribution Device)

Figure 8:
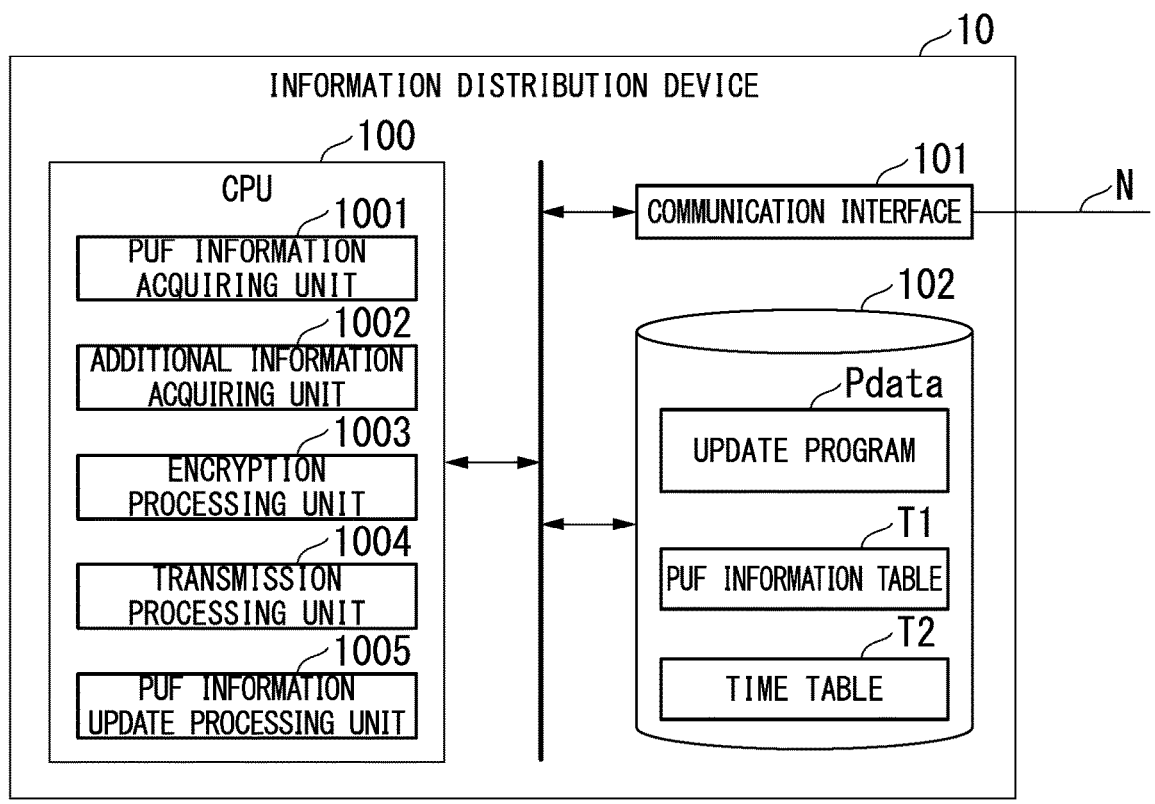
FIG. 8 is a diagram illustrating the functional configuration of an information distribution device according to a second embodiment.

FIG. 8 is a diagram illustrating the functional configuration of an information distribution device according to a second embodiment.

As illustrated in FIG. 8, a CPU 100 of the information distribution device 10 according to the second embodiment further has a function of a PUF information update processing unit 1005 in addition to the functions according to the first embodiment.

The PUF information update processing unit 1005 receives new PUF information from each of a plurality of control devices 11 and updates PUF information recorded in advance.

It is assumed that the PUF information output by a control device 11 (a PUF information output unit 112) changes with respect to time due to changes in characteristics occurring together with the operation of the control device 11. Thus, the PUF information update processing unit 1005 receives PUF information in which a change has occurred as "new PUF information" and sequentially records (updates) the PUF information in the PUF information table T1. In addition, in this case, the PUF information update processing unit 1005 also leaves recording of PUF information before the occurrence of the change as past PUF information.

(PUF Information Table)

FIG. 9 is a diagram illustrating a PUF information table according to the second embodiment.

As illustrated in FIG. 9, in a PUF information table T1 recorded in a recording medium 102, a "control device identification number," "past PUF information," and "PUF information" are recorded in association with each other.

The "past PUF information" is information representing PUF information output in the past by each control device 11 and is PUF information that is not the latest (PUF information and that has not been output at a current time point by the control device 11).

The "PUF information" is information representing PUF information output at the current time point by each control device 11 and is the latest PUF information.

The "past PUF information" and the "PUF information" are recorded together with update times (t10, t11, . . . ). In the example illustrated in FIG. 9, for a control device 11 of which the control device identification number is "A01," past PUF information acquired and updated at update times t10 (before shipment), t11, and t12 and PUF information updated at the latest update time t13 are recorded. In addition, for a control device 11 of which the control device identification number is "A02," past PUF information acquired and updated at update times t20 (before shipment), t21, and t22 and PUF information updated at the latest update time t23 are recorded. Furthermore, for a control device 11 of which the control device identification number is "A03," past PUF information acquired and updated at update times t30 (before shipment), t31, and t32 and PUF information updated at the latest update time t33 are recorded. This similarly applies also to the other control devices 11.

In the example illustrated in FIG. 9, although the numbers of pieces of past PUF information of control devices 11 are the same (three), actually, the number of pieces of past PUF information is different for each control device 11. This is because timings or a frequency at which the PUF information changes is different for each control device 11.

In addition, in a case in which PUF information output by the control device 11 is changed and is updated with new PUF information, the previous PUF information is classified as past PUF information. In the case of the example illustrated in FIG. 9, for example, in a case in which there is an update of PUF information for a control device 11 of which the control device identification number is "A01," PUF information associated with an update time t13 is classified as "past PUF information," and new PUF information acquired at the next update time t14 is recorded (updated) in the "PUF information."

(Time Table)

FIG. 10 is a diagram illustrating a time table according to the second embodiment.

As illustrated in HG 10, periods (Y1, Y2, . . . ) and update times (t10, t11, . . . ) are recorded in the time table T2 in association with each other.

As the periods (Y1, Y2, . . . ), periods specified using an actual year, month, and date, hour and minute, and the like are recorded. Each of the update times (t10, t11, . . . ) is a time at which PUF information is updated for each control device 11 in the PUF information table T1 illustrated in FIG. 9.

As illustrated in FIG. 10, a plurality of update times are associated with each control device 11 that is a target for the distribution of an update program Pdata in the time table T2. More specifically, in a column of "Distribution target: A01," update times (t10, t11, . . . ) of past PUF information output by a control device 11 of which the control device identification number is "A01" are recorded. In a column of "Distribution target: A02," update times (t20, t21, . . . ) of past PUF information output by a control device 11 of which the control device identification number is "A02" are recorded. In a column of "Distribution target: A03," update times (t30, t31, . . . ) of past PUF information output by a control device 11 of which the control device identification number is "A03" are recorded. This similarly applies also to the other columns.

(Functional Configuration of Control Device)

Figure 11:
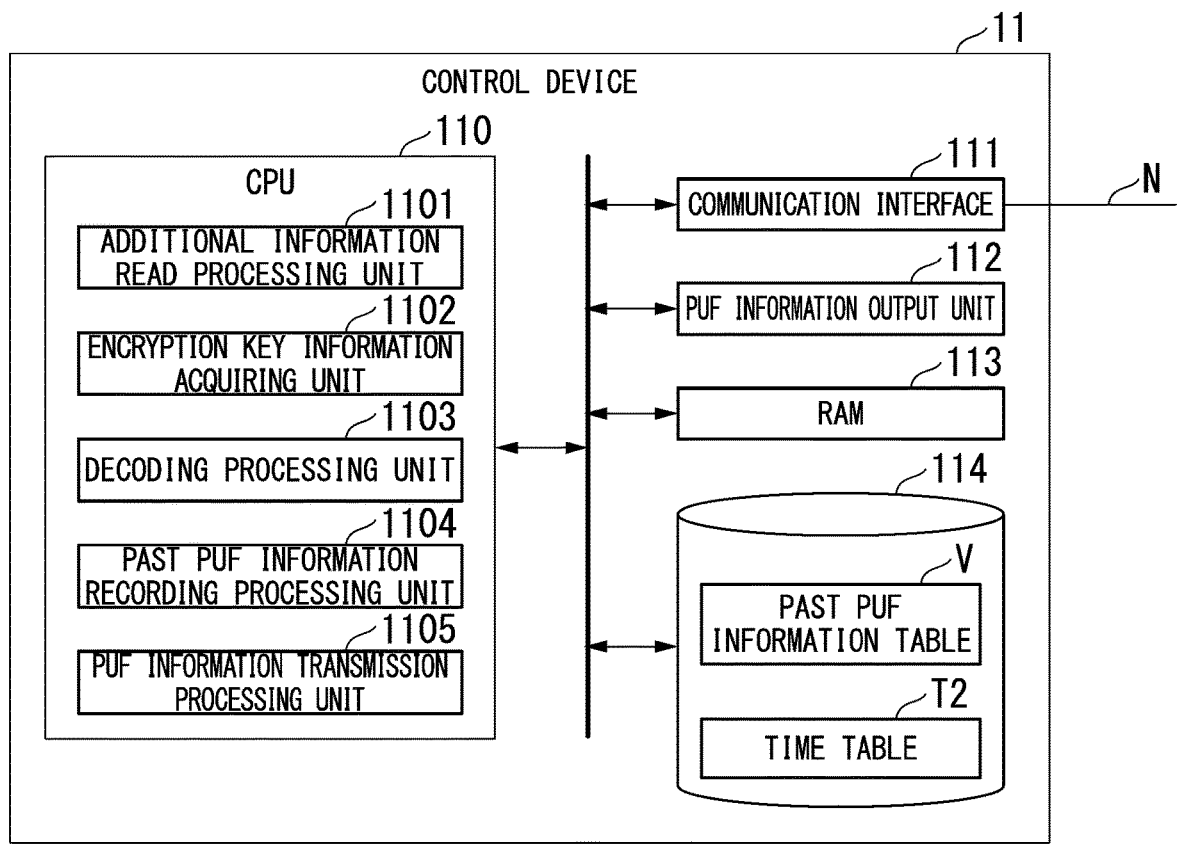
FIG. 11 is a diagram illustrating the functional configuration of a control device according to the second embodiment.

FIG. 11 is a diagram illustrating the functional configuration of a control device according to the second embodiment.

As illustrated in FIG. 11, a CPU 110 of the control device 11 according to the second embodiment has functions of a past PUF information recording processing unit 1104 and a PUF information transmission processing unit 1105 in addition to the functions according to the first embodiment.

In a case in which PUF information output from the PUF information output unit 112 has changed, the past PUF information recording processing unit 1104 records PUF information before change as past PUF information.

More specifically, the past PUF information recording processing unit 1104 regularly acquires PUF information output from the PUF information output unit 112 and temporarily stores the acquired PUF information in a volatile memory (for example, the RAM 113). At that time, PUF information acquired at this time is compared with PUF information acquired at the previous time (the PUF information temporarily recorded in the RAM 113 at the previous time), and it is determined whether the pieces of PUF information coincide with each other. Then, in the case of no coincidence therebetween, the past PUF information recording processing unit 1104 records the PUF information acquired at the previous time (the PUF information recorded in the RAM 113) in the recording medium 114 (the past PUF information table V) as past PUF information.

In a case in which PUF information output from the PUF information output unit 112 has changed, the PUF information transmission processing unit 1105 transmits the changed PUF information.

(Past PUF Information Table)

Figure 12:
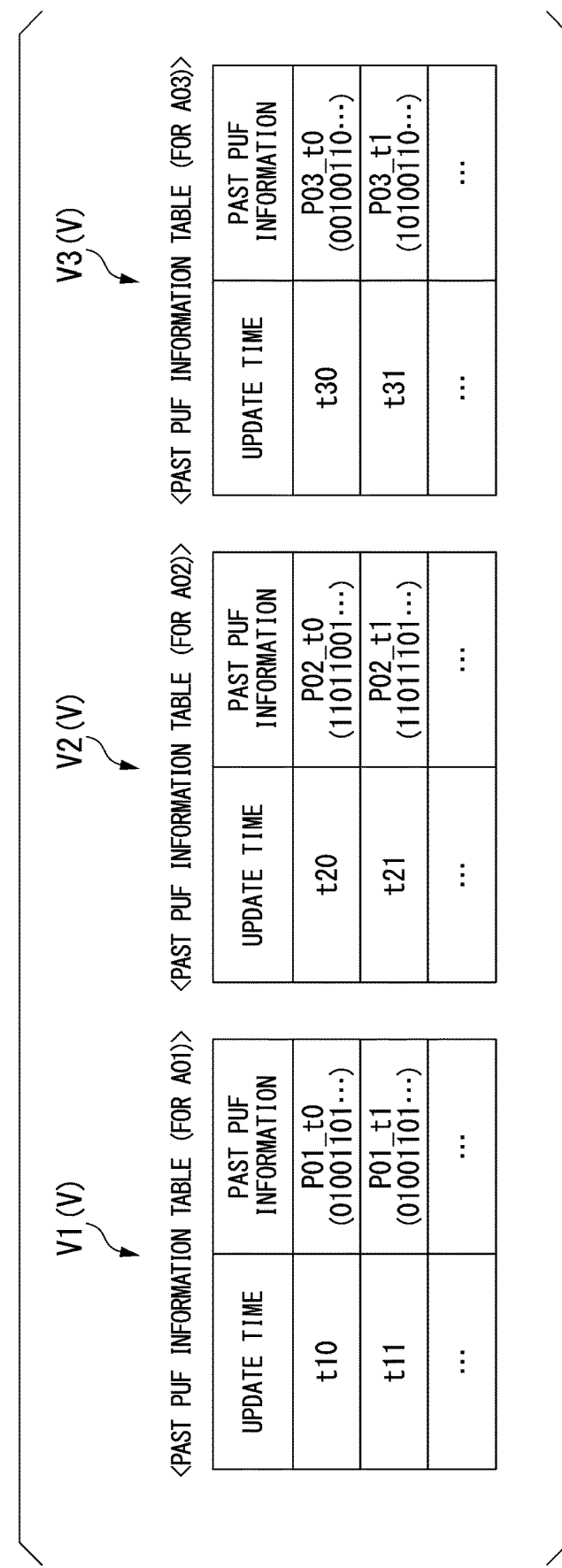
FIG. 12 is a diagram illustrating a past PUF information table according to the second embodiment.

FIG. 12 is a diagram illustrating a past PUF information table according to the second embodiment.

As illustrated in FIG. 12, in each of past PUF information tables V (V1 to V3), an update time of PUF information of the control device 11 and PUF information output by the PUF information output unit 112 after the update time (past PUF information) are recorded in association with each other.

In the past PUF information table V, PUF information is sequentially additionally recorded by the past PUF information recording processing unit 1104 at a timing at which the PUF information output from the PUF information output unit 112 is changed.

(First Process Flow)

Figure 13:
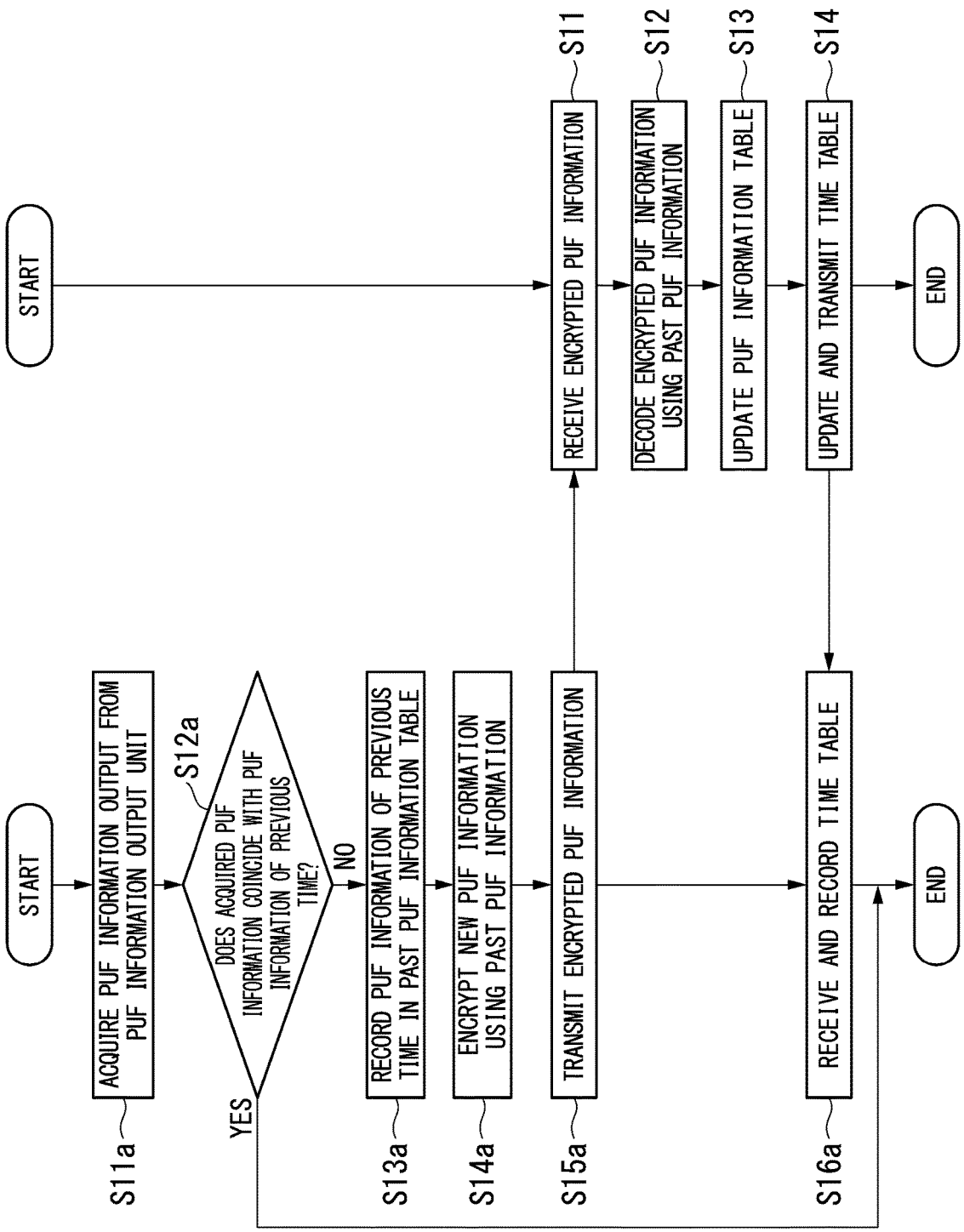
FIG. 13 is a diagram illustrating a first process flow executed by an information distribution device and a control device according to the second embodiment.

FIG. 13 is a diagram illustrating a first process flow executed by the information distribution device and the control device according to the second embodiment.

The first process flow illustrated in FIG. 13 is repeatedly executed at a constant period during the operation of the control device 11.

First, the past PUF information recording processing unit 1104 of the control device 11 regularly acquires PUF information output from the PUF information output unit 112 (Step S11a).

The past PUF information recording processing unit 1104 compares PUF information acquired at the previous time from the PUF information output unit 112 (the PUF information temporarily recorded in the RAM 113) and PUF information acquired at this time from the PUF information output unit 112 and determines whether or not the PUF information coincide with each other (Step S12a).

In a case in which the PUF information of this time coincides with the PUF information of the previous time (Yes in Step S12a), the past PUF information recording processing unit 1104 ends the process without performing a special process. In this case, after a predetermined time elapses, the past PUF information recording processing unit 1104 starts the process of Step S11a again.

On the other hand, in a case in which the PUF information of this time does not coincide with the PUF information of the previous time (No in Step S12a), it is determined that the PUF information output from the PUF information output unit 112 has been changed in accordance with characteristic variations (deterioration) of the circuit with respect to time or the like. Thus, the past PUF information recording processing unit 1104 additionally records the PUF information acquired at the previous time (the PUF information temporarily recorded in the RAM 113) in the past PUF information table V of the recording medium 114 (Step S13a). At this time, the control device 11 records the PUF information acquired at the previous time in association with the previous update time.

In addition, at this time, the past PUF information recording processing unit 1104 temporarily records the PUF information acquired at this time in the RAM 113 for comparison with the PUF information acquired at the next time.

Next, the PUF information transmission processing unit 1105 of the control device 11 encrypts new PUF information after occurrence of a change (the PUF information acquired in Step S11a) using PUF information immediately before the occurrence of the change (Step S14a). For example, in a case in which a time at which the change has occurred is a time tx, the PUF information transmission processing unit 1105 encrypts PUF information that is newly output from the recording medium 102 after the time tx using the PUF information output until immediately before the time tx (the PUF information that is temporarily recorded in the RAM 113).

The PUF information transmission processing unit 1105 attaches information representing a control device identification number of its own control device 11 and an update time to encrypted PUF information (hereinafter, also referred to as "encrypted PUF information") and transmits the information to the information distribution device 10 (Step S15a).

The information distribution device 10 receives the encrypted PUF information from the control device 11 (Step S11).

The PUF information update processing unit 1005 of the information distribution device 10 decodes the received encrypted PUF information (Step S12). At this time, the PUF information update processing unit 1005 decodes the encrypted PUF information using the PUF information of the control device 11 that has transmitted the encrypted PUF information (for example, latest PUF information before the change) by referring to the PUF information table T1 (FIG. 9).

The PUF information update processing unit 1005 updates the PUF information of the PUF information table T1 with the new PUF information acquired in the decoding process of Step S12 (Step S13). In addition, the PUF information update processing unit 1005 classifies the PUF information before update, which has been recorded in the PUF information table T1, into past PUF information.

Next, the PUF information update processing unit 1005 updates the time table T2 (Step S14). For example, in the example of the PUF information table T1 illustrated in FIG. 9, for a control device 11 of which the control device identification number is "A01," PUF information associated with the update time t13 is newly classified into past PUF information. Thus, the PUF information update processing unit 1005 assigns the update time t13 to one of predetermined periods (Y1, Y2, . . . ) of the time table T2 in addition to the update times t10, t11, and t12.

Next, the PUF information update processing unit 1005 distributes the updated time table T2 to the control device 11 (Step S14). Accordingly, the time tables T2 included in the information distribution device 10 and the control device 11 are synchronized with each other.

In addition, when the time table T2 is distributed, the PUF information update processing unit 1005 may encrypt the time table T2 using new PUF information (PUF information output by the control device 11 at the current time point). In such a case, the encrypted time table T2 can be decoded using the PUF information output by the PUF information output unit 112 of the control device 11.

The control device 11 receives the time table T2 and records the received time table T2 in the recording medium 114 (Step S16a).

(Second Process Flow)

Figure 14:
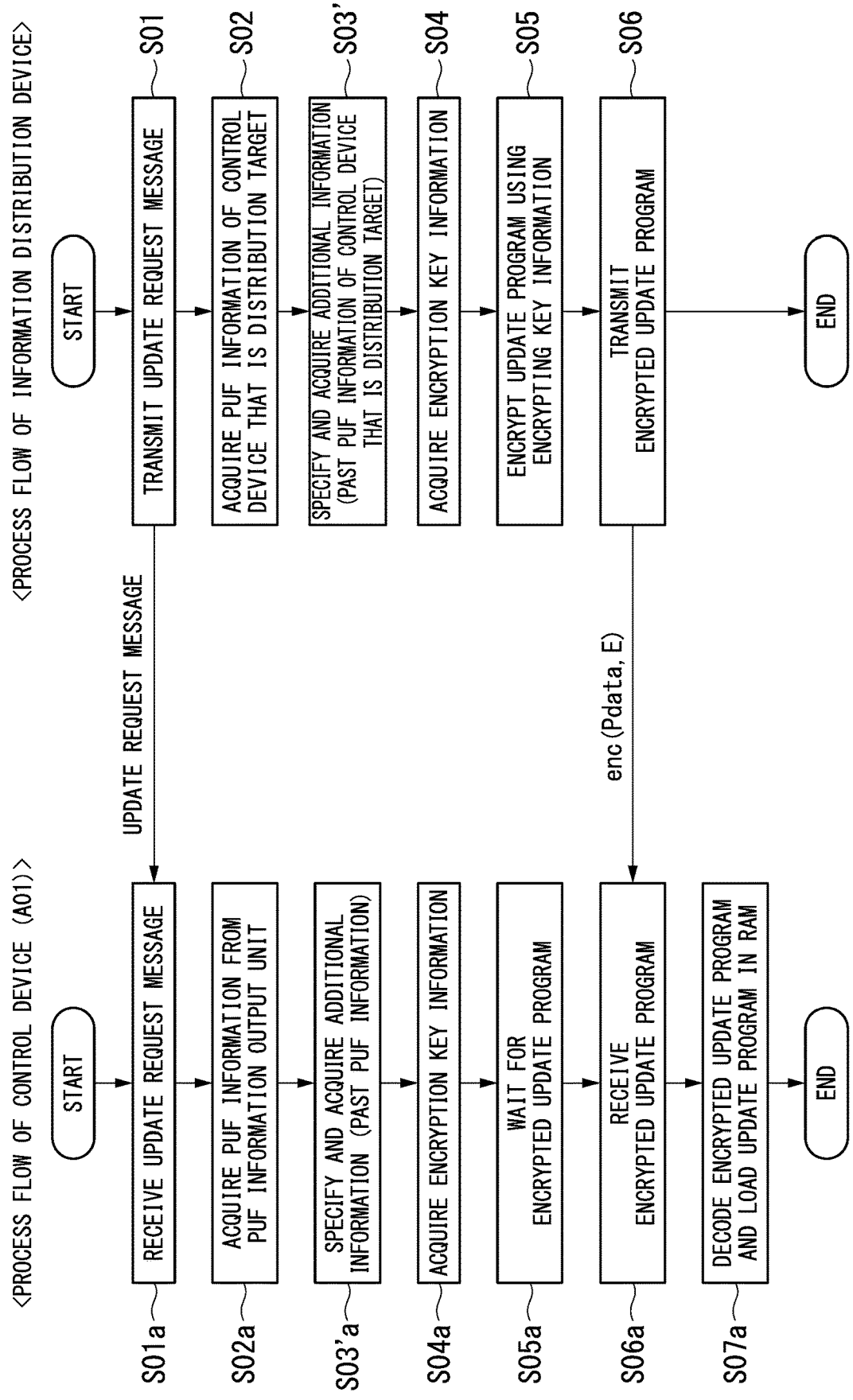
FIG. 14 is a diagram illustrating a second process flow executed by an information distribution device and a control device according to the second embodiment.

FIG. 14 is a diagram illustrating a second process flow executed by the information distribution device and the control device according to the second embodiment.

The process flow illustrated in FIG. 14 is a process flow executed when the information distribution device 10 distributes an update program to the control device 11 and is a process flow that is substantially similar to that of the first embodiment (FIG. 7).

The information distribution device 10 according to the second embodiment executes a process of Step S03' replacing the process of Step S03 (FIG. 7) according to the first embodiment. In addition, the control device 11 according to the second embodiment executes a process of Step S03a' replacing the process of Step S03a (FIG. 7) according to the first embodiment.

Hereinafter, the processes of Step S03' and Step S03a' will be described in detail.

The additional information acquiring unit 1002 of the information distribution device 10 specifies and acquires one of pieces of past PUF information of the control device 11 that is a distribution target as additional information (Step S03').

More specifically, first, the additional information acquiring unit 1002 specifies one of update times (t10, t11, . . . ) corresponding to the current time and the distribution target by referring to the time table T2 (FIG. 10) recorded in the recording medium 102 in advance. For example, in a case in which the current time belongs to a period Y2, and the control device 11 of which the control device identification number is "A01" is set as a distribution target, the additional information acquiring unit 1002 specifies an update time "t11" by referring to the time table T2 (see FIG. 10).

Subsequently, the additional information acquiring unit 1002 acquires PUF information corresponding to the update time, which has been specified by referring to the time table T2, by referring to the PUF information table T1 (FIG. 9). For example, in a case in which an update time "t11" is specified by referring to the time table T2, the additional information acquiring unit 1002 additionally acquires PUF information P01_t11 that is "01001101 . . . " by referring to the PUF information table T1 (FIG. 9).

In addition, the additional information read processing unit 1101 of the control device 11 specifies and acquires one among pieces of past PUF information of the control device 11 that is a distribution target by referring to the recording medium 114 (Step S03a').

More specifically, first, the additional information read processing unit 1101 specifies one of update times (t10, t11, . . . ) corresponding to the current time and the control device 11 (its own device) that is a distribution target by referring to the time table T2 (FIG. 10) recorded in the recording medium 114 in advance. For example, in a case in which the current time belongs to a period Y2, and the control device identification number of its own device is "A01," the additional information read processing unit 1101 specifies an update time "t11" by referring to the time table T2 (see FIG. 10).

Subsequently, the additional information read processing unit 1101 acquires past PUF information corresponding to the update time, which has been specified by referring to the time table T2, by referring to the past PUF information table V (FIG. 12) recorded in the recording medium 114 in advance. For example, in a case in which the control device identification number of its own device is "A01," and an update time "t11" is specified by referring to the time table T2, the additional information read processing unit 1101 acquires past PUF information P01_t11 that is "01001101 . . . " by referring to the past PUF information table V1 (see FIG. 12).

In the process flow illustrated in FIG. 14, processes other than the processes of Step S03' and Step S3a' are similar to those according to the first embodiment (FIG. 7), and thus description thereof will not be presented here.

(Operation and Effects)

As described above, the information distribution device 10 according to the second embodiment further includes the PUF information update processing unit 1005 that receives new PUF information from the control device 11 and updates PUF information recorded in advance.

By configuring as such, even in a case in which PUF information output by the control device 11 has changed in accordance with elapse of time, the update program Pdata can be encrypted using encryption key information including PUF information after the change (new PUF information).

In addition, the control device 11 according to the second embodiment further includes the PUF information transmission processing unit 1105 that transmits changed PUF information in a case in which PUF information output from the PUF information output unit 112 has changed.

Accordingly, the information distribution device 10 can acquire new PUF information of the control device 11 and updates the PUF information.

In addition, according to the control device 11 of the second embodiment, the PUF information transmission processing unit 1105 encrypts changed PUF information using the PUF information before the change and transmits the encrypted PUF information (see Step S14a illustrated in FIG. 13).

By configuring as such, the changed PUF information can be securely transmitted, and encryption key information used for encrypting the PUF information is changed at each time, and accordingly, a risk of the PUF information being decoded can be reduced.

Other Embodiment

As above, although the information distribution system 1 according to the first and second embodiments has been described in detail, a specific form of the information distribution system 1 is not limited to those described above, and various design changes and the like may be made within a range not departing from the concept.

For example, although the control device 11 according to the first and second embodiments has been described to include the same time table T2 as that of the information distribution device 10 for acquiring the same encryption key information as the encryption key information E acquired by the information distribution device 10, other embodiments are not limited to such a form.

For example, the control device 11 according to a modified example of the first embodiment reads PUF information (P01, P02, P03, . . . ) recorded in the recording medium 114 (the other-device PUF information table U) and acquires a plurality of pieces of encryption key information (encryption key information E1, E2, E3, . . . ) respectively corresponding to the PUF information. Then, the control device 11 may try a decoding process sequentially using the encryption key information E1, E2, E3, . . . until a correct update program Pdata can be decoded.

In addition, the information distribution system 1 according to another embodiment may have a form acquired by combining the first embodiment and the second embodiment.

More specifically, the additional information acquiring unit 1002 of the information distribution device 10 may specify past PUF information of a control device other than the control device 11 that is a distribution target as additional information. For example, in a case in which a control device 11 of which the control device identification number is "A01" is a distribution target, the additional information acquiring unit 1002 may specify past PUF information P02_t21 or the like of a control device 11, of which the control device identification number is "A02," other than distribution target in the PUF information table (FIG. 9).

Accordingly, options of additional information can be further increased, and the risk of the information of being decoded can be reduced.

In addition, in this case, each control device 11 needs to record not only the past PUF information table of its own device but also past PUF information tables of other control devices 11.

In addition, although the information distribution system 1 according to the first embodiment and the second embodiment has been described to acquire encryption key information E by combining one piece of additional information (PUF information or past PUF information of other devices) with one piece of PUF information, other embodiments are not limited to such a form.

In other words, the information distribution device 10 according to another embodiment may acquire encryption key information E by combining two or more pieces of additional information with PUF information of the control device 11 that is a distribution target. In such a case, the control device 11, similarly, acquires encryption key information E by combining two or more pieces of additional information, which are equivalent to the description presented above, with PUF information output by the PUF information output unit 112 of its own device.

By configuring as such, for example, in a case in which encryption key information E is built using in pieces among n pieces of PUF information recorded in advance, encryption key information can be appropriately selected from among a large number of $_nC_m$ pieces of encryption key information E.

In this way, since the number of pieces of encryption key information E is different, the security can be improved using more pieces of encryption key information E than the complexity of encryption using only two pieces of PUF information. In other words, the number of options of additional information can be further increased, and accordingly, the risk of information being decoded can be further reduced.

In addition, according to a second aspect of the present disclosure, the additional information is PUF information of a device other than the distribution target device.

Furthermore, according to a third aspect of the present disclosure, the additional information is past PUF information of the distribution target device.

In addition, according to a fourth aspect of the present disclosure, the additional information acquiring unit is configured to specify and acquire two or more pieces of additional information. In addition, the encryption processing unit is configured to encrypt the protection target information by combining the two or more pieces of additional information with the acquired PUF information.

Furthermore, according to a fifth aspect of the present disclosure, the information distribution device described above further includes a PUF information update processing unit configured to receive new PUF information from the distribution target device and update PUF information recorded in advance.

In addition, according to a sixth aspect of the present disclosure, there is provided a distribution target device configured to receive encrypted protection target information from an information distribution device connected through a communication network, the distribution target device including: a PUF information output unit configured to output PUF information; an additional information read processing unit configured to specify and read any piece of additional information from a recording medium in which a plurality of pieces of additional information are recorded in advance; an encryption key information acquiring unit configured to acquire encryption key information based on the specified additional information and the PUF information output by the PUF information output unit; and a decoding processing unit configured to decode the encrypted protection target information using the encryption key information.

Furthermore, according to a seventh aspect of the present disclosure, the distribution target device described above further includes a PUF information transmission processing unit configured to transmit changed PUF information in a case in which the PUF information output from the PUF information output unit has changed.

In addition, according to an eighth aspect of the present disclosure, the PUF information transmission processing unit is configured to encrypt the changed PUF information using the PUF information before change and transmit the encrypted PUF information.

Furthermore, according to a ninth aspect of the present disclosure, there is provided an information distribution system including: the information distribution device described above; and the distribution target device described above.

In addition, according to a tenth aspect of the present disclosure, there is provided an information distribution method for distributing encrypted protection target information to a distribution target device connected through a communication network, the information distribution method including: acquiring PUF information of the distribution target device recorded in advance; specifying and acquiring any of a plurality of pieces of additional information recorded in advance; encrypting protection target information on the basis of the PUF information and the additional information that are acquired; and transmitting the encrypted protection target information to the distribution target device, wherein the specifying and acquiring any of the plurality of pieces of additional information includes changing the additional information to be specified in accordance with a time.

Furthermore, according to an eleventh aspect of the present disclosure, there is provided a non-transitory computer-readable medium having a program recorded thereon, the program causing an information distribution device, which is configured to distribute encrypted protection target information to a distribution target device connected through a communication network, to function as: a PUF information acquiring unit configured to acquire PUF information of the distribution target device recorded in advance; an additional information acquiring unit configured to specify and acquire any of a plurality of pieces of additional information recorded in advance; an encryption processing unit configured to encrypt protection target information on the basis of the PUF information and the additional information that are acquired; and a transmission processing unit configured to transmit the encrypted protection target information to the distribution target device, wherein the additional information acquiring unit is configured to change the additional information to be specified in accordance with a time.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

REFERENCE SIGNS LIST 1 information distribution system
10 information distribution device
100 CPU
1001 PUF information acquiring unit
1002 additional information acquiring unit
1003 encryption processing unit
1004 transmission processing unit
1005 PUF information update processing unit
101 communication interface
102 recording medium 11 control device (distribution target device)
110 CPU
1101 additional information read processing unit
1102 encryption key information acquiring unit
1103 decoding processing unit
1104 past PUF information recording processing unit
1105 PUF information transmission processing unit
111 communication interface
112 PUF information output unit
113 RAM
114 recording medium
T1 PUF information table
T2 time table
U other-device PUF information table
V past PUF information table
Pdata update program (protection target information)

The invention claimed is:

1. An information distribution device configured to distribute encrypted protection target information to a distribution target device connected through a communication network, the information distribution device comprising:
a processor; and
a non-transitory computer-readable medium having a program recorded thereon that, when executed by the processor, causes the information distribution device to function as:
a physically unclonable function (PUF) information acquiring unit configured to acquire PUF information of the distribution target device recorded in advance;
an additional information acquiring unit configured to specify and acquire any of a plurality of pieces of additional information recorded in advance;
an encryption processing unit configured to encrypt protection target information based on the PUF information and the additional information that are acquired; and
a transmission processing unit configured to transmit the encrypted protection target information to the distribution target device,
wherein:
the additional information acquiring unit is configured to change the additional information to be specified in accordance with a time; and
the additional information is PUF information of a device other than the distribution target device.

2. The information distribution device according to claim 1,
wherein the pieces of additional information include two or more pieces of additional information, and
wherein the encryption processing unit is configured to encrypt the protection target information by combining the two or more pieces of additional information with the acquired PUF information.

3. The information distribution device according to claim 1, wherein the program, when executed by the processor, causes the information distribution device to further function as a PUF information update processing unit configured to receive new PUF information from the distribution target device and update the PUF information of the distribution target device recorded in advance.

4. A distribution target device configured to receive encrypted protection target information from an information distribution device connected through a communication network, the distribution target device comprising:
a processor; and
a non-transitory computer-readable medium having a program recorded thereon that, when executed by the processor, causes the distribution target device to function as:
a physically unclonable function (PUF) information output unit configured to output PUF information;
an additional information read processing unit configured to specify and read any piece of additional information from a recording medium in which a plurality of pieces of additional information are recorded in advance;
an encryption key information acquiring unit configured to acquire encryption key information based on the specified additional information and the PUF information output by the PUF information output unit; and
a decoding processing unit configured to decode the encrypted protection target information using the encryption key information,
wherein the additional information is PUF information of a device other than the distribution target device.

5. The distribution target device according to claim 4, wherein the program, when executed by the processor, causes the distribution target device to further function as a PUF information transmission processing unit configured to transmit changed PUF information in a case in which the PUF information output by the PUF information output unit has changed.

6. The distribution target device according to claim 5, wherein the PUF information transmission processing unit is configured to encrypt the changed PUF information using the PUF information before change and transmit the encrypted PUF information.

7. An information distribution system comprising:
the information distribution device according to claim 1; and
a distribution target device configured to receive encrypted protection target information from the information distribution device, the distribution target device comprising:
a processor; and
a non-transitory computer-readable medium having a program recorded thereon that, when executed by the processor, causes the distribution target device to function as:
a PUF information output unit configured to output PUF information;
an additional information read processing unit configured to specify and read any piece of additional information from a recording medium in which a plurality of pieces of additional information are recorded in advance;
an encryption key information acquiring unit configured to acquire encryption key information based on the specified additional information and the PUF information output by the PUF information output unit; and
a decoding processing unit configured to decode the encrypted protection target information using the encryption key information.

8. An information distribution method for distributing encrypted protection target information to a distribution target device connected through a communication network, the information distribution method comprising:
acquiring physically unclonable function (PUF) information of the distribution target device recorded in advance;
specifying and acquiring any of a plurality of pieces of additional information recorded in advance;
encrypting protection target information based on the PUF information and the additional information that are acquired; and
transmitting the encrypted protection target information to the distribution target device, wherein:
the specifying and acquiring any of the plurality of pieces of additional information includes changing the additional information to be specified in accordance with a time; and
the additional information is PUF information of a device other than the distribution target device.

9. A non-transitory computer-readable medium having a program recorded thereon, the program causing an information distribution device, which is configured to distribute encrypted protection target information to a distribution target device connected through a communication network, to function as:
  a physically unclonable function (PUF) information acquiring unit configured to acquire PUF information of the distribution target device recorded in advance;
  an additional information acquiring unit configured to specify and acquire any of a plurality of pieces of additional information recorded in advance;
  an encryption processing unit configured to encrypt protection target information based on the PUF information and the additional information that are acquired; and
  a transmission processing unit configured to transmit the encrypted protection target information to the distribution target device,
wherein:
the additional information acquiring unit is configured to change the additional information to be specified in accordance with a time; and
the additional information is PUF information of a device other than the distribution target device.

\* \* \* \* \*